(12) United States Patent
Straka

(10) Patent No.: US 8,080,905 B2
(45) Date of Patent: Dec. 20, 2011

(54) CONTROL SYSTEM

(75) Inventor: David A. Straka, Hudson, OH (US)

(73) Assignee: Delta Systems, Inc., Streetsboro, OH (US)

( * ) Notice: Subject to any disclaimer, the term of this patent is extended or adjusted under 35 U.S.C. 154(b) by 965 days.

(21) Appl. No.: 12/038,287

(22) Filed: Feb. 27, 2008

(65) Prior Publication Data

US 2008/0218002 A1 Sep. 11, 2008

Related U.S. Application Data

(60) Provisional application No. 60/891,900, filed on Feb. 27, 2007.

(51) Int. Cl.
*H01H 83/20* (2006.01)

(52) U.S. Cl. ........................................ 307/131

(58) Field of Classification Search ........... 307/125–131
See application file for complete search history.

(56) References Cited

U.S. PATENT DOCUMENTS

| | | | |
|---|---|---|---|
| 3,600,604 A * | 8/1971 | Thorne-Booth | 326/14 |
| 6,608,555 B1 * | 8/2003 | Chang | 340/439 |
| 7,391,204 B2 * | 6/2008 | Bicking | 324/207.21 |
| 7,528,582 B1 * | 5/2009 | Ferguson | 320/164 |
| 7,561,389 B2 * | 7/2009 | Ishikawa et al. | 361/42 |

FOREIGN PATENT DOCUMENTS

JP 363293479 A * 11/1988

* cited by examiner

*Primary Examiner* — Albert W Paladini
(74) *Attorney, Agent, or Firm* — Tarolli, Sundheim, Covell & Tummino LLP

(57) ABSTRACT

A control system for an electrical device includes a controller that outputs an AC device enable system when one or more monitored sensors are in a proper state for operation of the electrical device. The control system may also include a sensor signal integrity checking circuit that outputs a validation signal when the sensor is one of a discrete set of acceptable sensor states. The control system may also include a current monitor that monitors the current draw of the electrical device and compares the current draw to a range of acceptable current draw levels and durations and disables operation of the electrical device when the current draw falls outside of the range.

29 Claims, 6 Drawing Sheets

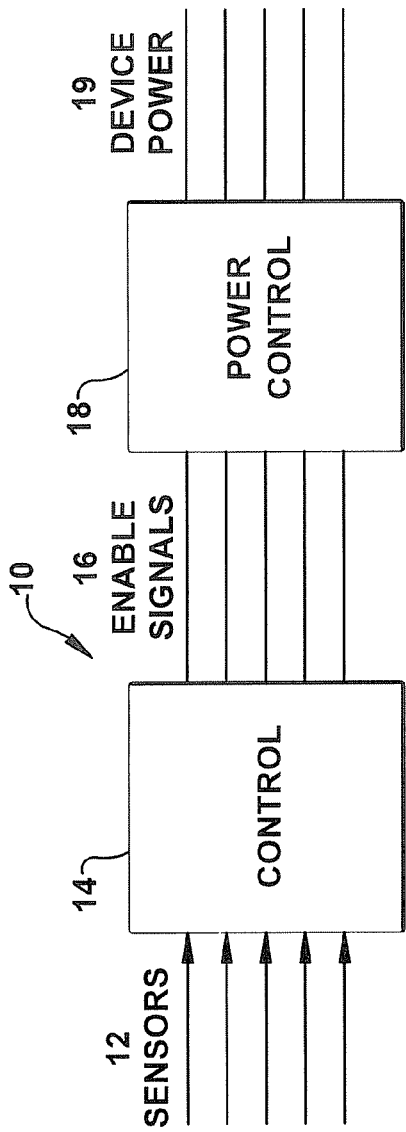
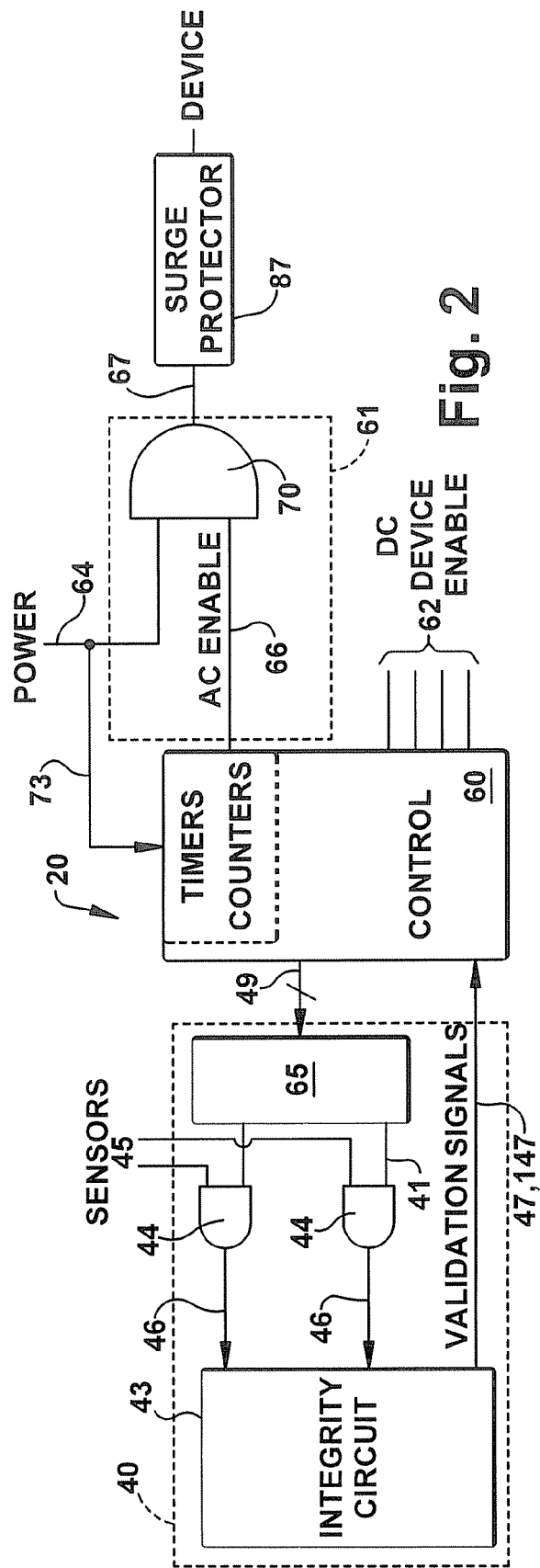

CONTROL SYSTEM

CROSS REFERENCE TO RELATED APPLICATIONS

This non-provisional application claims the benefit of U.S. Provisional Patent Application No. 60/891,900, entitled "Control Module," filed on Feb. 27, 2007, the entire disclosure of which is incorporated herein by reference.

BACKGROUND OF THE INVENTION

Many outdoor utility vehicles include electrical or electronic control systems that disable operation of the vehicle's engine, ignition system, or power takeoff when certain operating conditions are not met. For example, the control system may prevent operation of the ignition circuit if the presence of an operator is not detected by a sensor, such as, for example a seat switch. Because outdoor utility vehicles are subject to relatively extreme environmental conditions, including moisture, control circuits are protected against the elements by such measures as sealed housings.

SUMMARY

The disclosed control systems and methods for an electrical device include features that protect against operation of the electrical device based on false data produced by malfunctioning components. The control system, in one embodiment may include a controller that controls operation of an electrical device based on the present state of one or more sensors. In a more specific embodiment, the controller generates an AC device enable signal when the outputs of each of the sensors indicates that operation of the device is appropriate. The control system prevents operation of the device in the absence of the AC device enable signal. The control system may alternatively or additionally provide a sensor integrity check component that polls a present state of the one or more sensors. The sensor integrity check component outputs a validation signal when the sensor exhibits an acceptable sensor state. The control system prevents operation of the device in the absence of the validation signal. The control system may alternatively or additionally monitor a current draw of the electrical device and disable operation of the device when the current draw exceeds predetermined current amounts for predetermined durations.

BRIEF DESCRIPTION OF THE DRAWINGS

FIG. 1 is a functional block diagram of a control system constructed in accordance with an embodiment of the present invention;

FIG. 2 is a functional block diagram of a control system constructed in accordance with an embodiment of the present invention.

DETAILED DESCRIPTION

Figure 3:
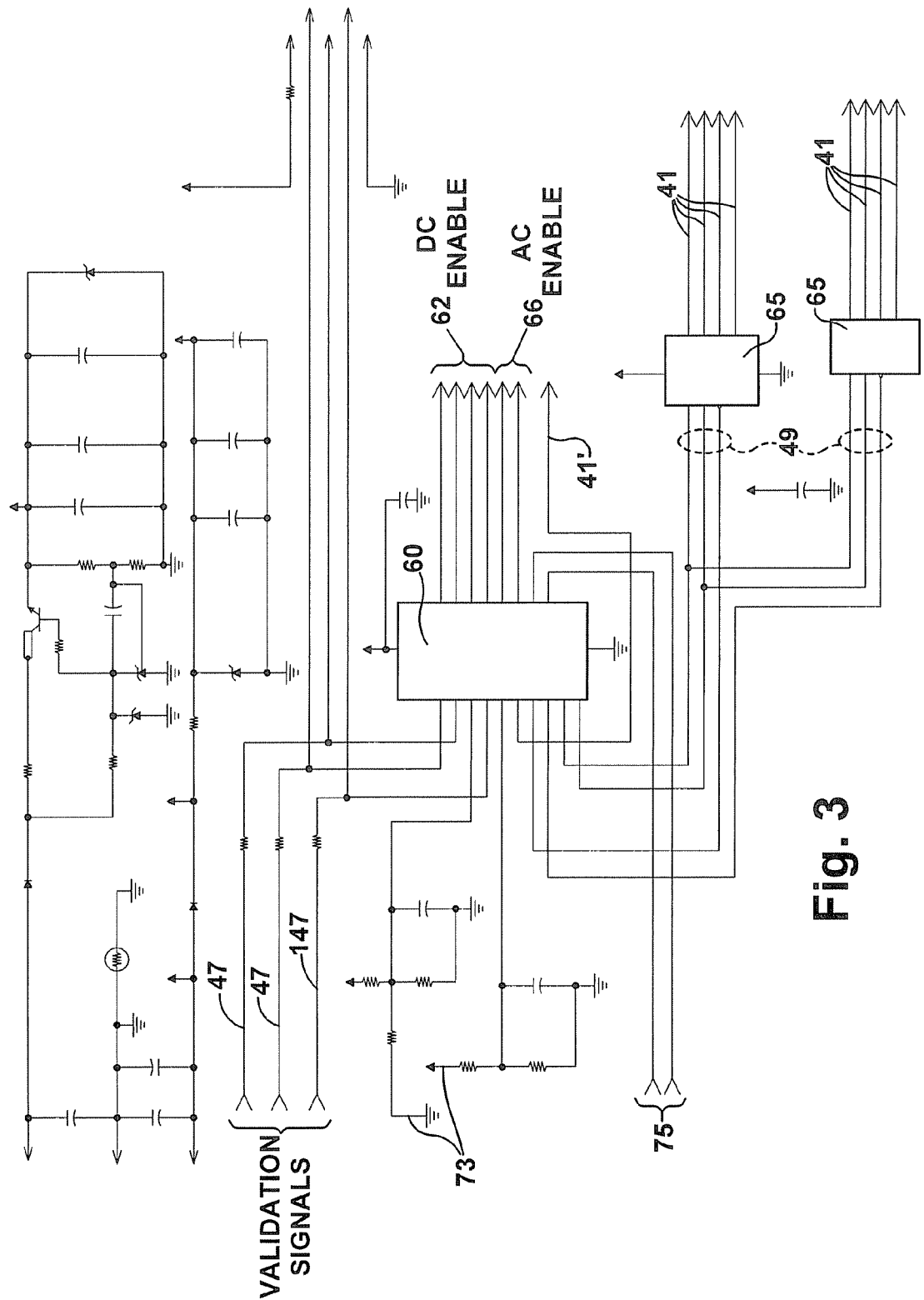
FIGS. 3-6 are electrical schematics, that illustrate in their entirety an exemplary circuit constructed to implement a control system in accordance with an embodiment of the present invention.

FIG. 1 illustrates a prior art simple tractor control system 10. The control system includes a controller 14 that may be implemented in many different ways, including but not limited to a microprocessor, discrete components including analog or digital hardwired control circuits, or any other appropriate components and circuits. The controller 14 monitors the outputs of various sensors 12 that are located on the tractor. These sensors may include, for example, a seat switch that closes when an operator is present in the seat, a power brake switch that closes when the parking brake is engaged, a start switch that is closed when the key is turned to the start position, and a power takeoff ("PTO") switch that is closed when the operator calls for operation of the PTO. When a present state of these sensors indicates that the tractor is in a proper condition for operation of one or more various electrical devices (not shown) on the tractor the controller 14 produces DC enable signals 16 that enable operation of each of those devices. The DC enable signals may, for example, trigger a relay to connect power to a given device. For example, the electrical devices that are enabled by the enable signals 16 may include a starter solenoid, a power takeoff (PTO), and a deck lift mechanism. The enable signals are input to power control circuits 18 to enable to flow of device power 19, which may be supplied by a tractor battery (not shown), to the enabled device.

The sensors 12 may be implemented as, for example, two position switches that present an open or closed state or two distinct output states. Due to the harsh environment in which they are used, the sensors 12 are susceptible to malfunction caused by contamination. For example, water may short or lower the impedance between the terminals of the switch and produce a false closed signal. Alternatively, foreign matter may interfere with a closed switch to produce a false open signal. Contamination may also produce faulty enable signals, which as noted above, are generally DC signals. The contamination in the control system may produce a DC signal that mimics an enable signal. In order to protect against faulty signals, many control systems are located in sealed modules and sensors are sealed against moisture and foreign material entry. As will be seen with reference to FIGS. 2-6, the control system described herein includes various measures that are taken within the control system to protect against faulty signals caused by contamination of the system by moisture and foreign material. While the control system described herein is within the context of a tractor control system, it will be apparent to one of skill in the art that the control system described herein could also be advantageous when used in any control environment in which it is desirable to protect against enabling operation of a device in response to a faulty signal that is generated by a control system component malfunction.

Referring now to FIG. 2, a function block diagram depicts a control system 20. The control system 20 functions in a similar manner to the control system 10 but includes features that are directed to discerning between signals that are generated by false signals caused by contamination and signals that are properly generated by the controller and/or sensors. To check the signals from sensors, the control system 20 includes a signal integrity check 40 that pulls current from a normally open sensor or pushes current through a normally closed sensor to verify that signal from the sensor 45 results from the closing or opening of a sensor and not a signal caused by contamination. The controller 60 receives validation signals 47 (corresponding to normally open sensors) and 147 (corresponding to normally closed sensors) from the signal integrity check 40. Based on the validation signals 47, 147, the controller 60 outputs DC and AC enable signals 62 and 66.

The signal integrity check 40 may be controlled by the controller 60 to poll and validate the various sensors 45 and pass the status of the various sensors by way of a validation signal 47, 147 to the controller. To this end, the controller 60 sends a sequence of sets of selection signals 49 to a decoder 65. In response, the decoder 65 outputs an enable single on one sample enable line 41 from the decoder. Each sample enable line 41 selects a sensor 45 to be connected by a connection 46 to the integrity circuit 43. The integrity circuit 43 verifies that the output of the sensor 45 is the result of a proper operational state, for example an open or closed switch position. The integrity circuit outputs a validation signal 47, 147 that indicates that the sensor state is proper and the validation signal is passed back to the controller 60. The controller matches the validation signal 47, 147 to the selection signals 49 to determine which sensor's signal was polled by the integrity check 40. While the integrity check 40 is shown as part of an overall control system 20, it will be understood that the integrity check 40 may be used alone or in combination with the other features described herein.

To protect against false enable signals, the controller 60 outputs two AC enable signals 66 (only one shown in FIG. 2) that enable passage of electrical power 67 to two selected electrical devices, such as, for example, the starter solenoid and PTO clutch (not shown). The AC enable signals 66 are readily distinguishable from a signal caused by contamination, which would likely be DC. If an AC enable signal 66 is not present, the control system prevents power from passing to the starter solenoid or PTO clutch. In the described embodiment, the controller 60 also outputs DC control signals 62 to other tractor devices such as the fuel pump or deck lift mechanism. It will be apparent to one of skill in the art that any number of the enable signals generated by the controller may be AC.

The controller 60 outputs the DC control signals 62 and AC enable signals 66 based on the validation signal 47, 147 from the signal integrity check 40. Each AC enable signal 66 is detected by an enable signal check 70 that, functionally speaking, allows passage of electrical power 67 to the electrical device from a vehicle power source, generally indicated as 64, when the AC enable signal is present. The enable signal check 70 may condition the AC signal to allow it to be better processed by other components in the control system. For example, as will be described below, the AC enable may be transformed into a pulse train prior to use of the enable signal to enable power being passed to the device. The controller 60 operates according to an algorithm that specifies which combinations of past and present sensor states should result in the output of the AC enable signal. Of course, the controller may be implemented as a hard wired control circuit or any other appropriate means. The use of AC enable signals is shown in conjunction with many different features, however, it will be apparent to one of skill in the art that an AC control signal may be used alone or in connection with any number of features.

FIG. 2 also functionally illustrates circuit protection measures taken to limit the heating effects of high current draw during operation. These protective measures facilitate implementation of the control system using solid state components. A surge protector 87 prevents the flow of current in the event of high current draw, such as, for example, a starter solenoid current draw of over 20 A for longer than a relatively short period of time. The controller 60 monitors device power sources 64 of the various devices as shown functionally in FIG. 1 by a monitoring line 73. The controller 60 monitors the device power with internal timing mechanisms and counters. These timing mechanisms monitor a duration of time during which power is being provided to the electrical device. If power is provided for a longer period of time than allowed, the AC enable signal corresponding to the device is interrupted and a counter is incremented. If the AC enable signal is interrupted by the controller a predetermined number of times, such as, for example, three times, the control system 20 disallows the flow of power to the electrical device by ceasing to output the AC enable signal 66 until the controller resets after a predetermined amount of time.

FIGS. 3-6 are circuit schematics illustrating an exemplary circuit implementation of the control system 20. These schematics will be described in functional terms, without detailing component values or exhaustively describing the function of each component. Referring first to FIG. 3, in the described embodiment, the controller 60 is a microprocessor that has among its inputs: validation signals 47, 147, PTO clutch monitor and starter monitor signals 75, and a current monitor 73 that is used for circuit protection. The controller 60 outputs four DC control signals (described in more detail with reference to FIG. 7). The DC control signals control such devices as, for example, a magneto interrupt signal, a diagnostic LED signal, a fuel solenoid enable signal, and a deck lift enable signal. The controller 60 also outputs the AC enable signals 66 (described in more detail with reference to FIG. 5), one for the starter solenoid and one for the PTO clutch. The PTO clutch monitor and starter monitor signals 75 are used as the controller as part of a diagnostic check. As will be described in more detail with reference to FIG. 5, these signals should indicate that power is flowing to the PTO clutch and/or starter solenoid when the AC enable signal 66 is being generated and operation of the PTO clutch and/or starter solenoid is called for. If these signals indicate that power is not flowing, an error condition is detected by the controller.

Figure 4A:
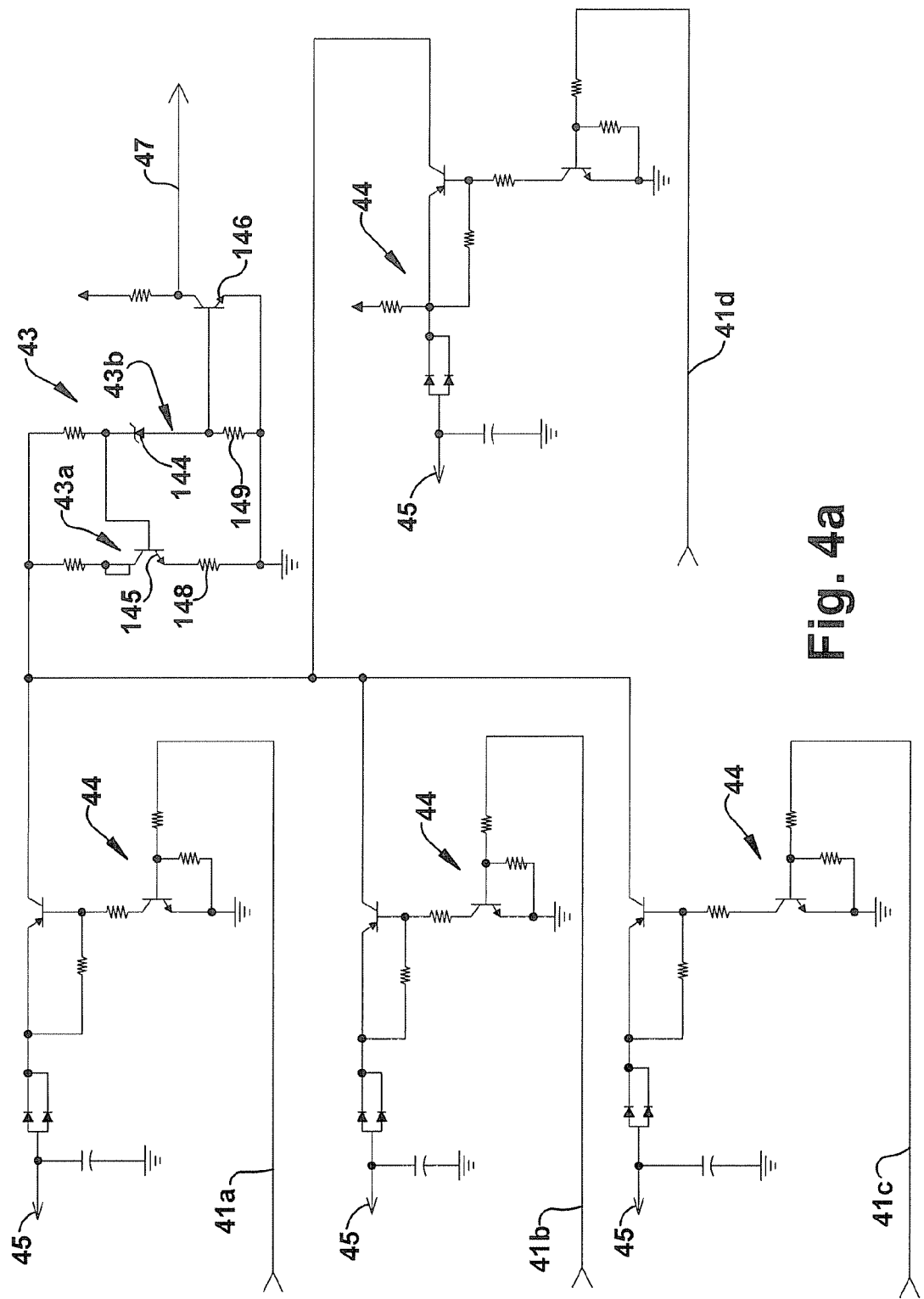
Figure 4B:
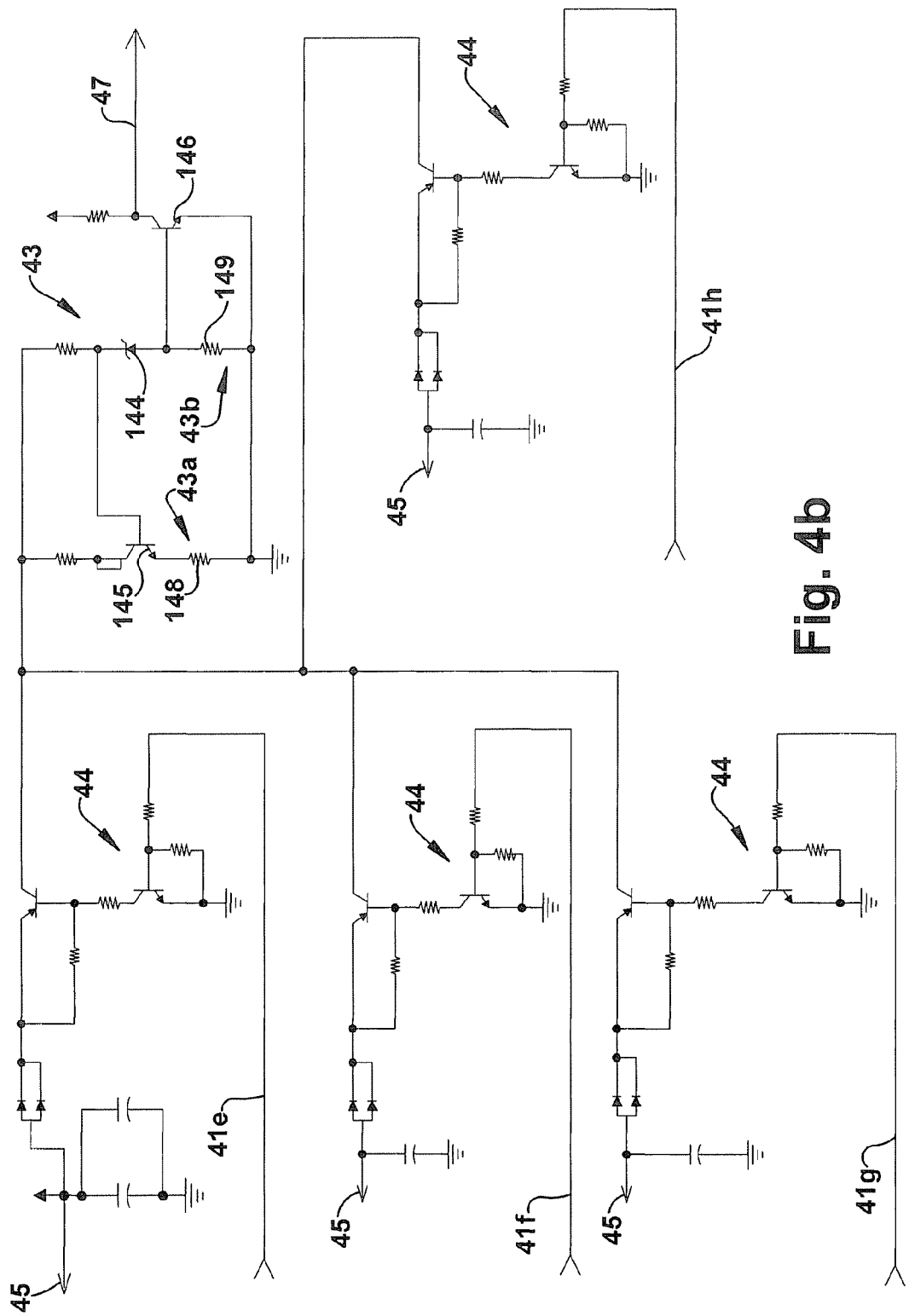

To conduct the polling of the status sensors 45 (FIG. 2), the controller 60 outputs the selection signals 49 to two decoders 65. Based on the selection signals, each decoder 65 outputs a single sample enable signal 41 that selects one of four sensor outputs to be connected to the signal integrity check circuits 43. Referring now to FIGS. 4a and 4b, an exemplary circuit embodiment of the validation check 40 is shown. The circuit shown in FIG. 4b is analogous to that shown in FIG. 4a except that it processes the outputs of four different sensors not processed by the circuit of FIG. 4a. In FIG. 4a, output signals from four sensors 45, a left steering arm switch and a right steering arm switch, a deck lift switch, and a PTO stop switch are each input to the integrity check circuit 43 through an enable circuit 44. Each enable circuit 44 connects the sensor 45 to which it is connected to the signal integrity check circuit 43 for validation when the corresponding sample enable signal 41 is present. Hence, based on the input to the decoder 65 (FIG. 1 and 2a), at any given time, the output of one of the four sensors 45 is connected to the signal integrity check circuit 43.

The signal integrity check circuit 43 checks for the presence of foreign material, such as moisture, bridging the terminals of the sensor 45 and producing a false closed signal. When the sensor is connected to the signal integrity check circuit 43, the signal integrity check circuit attempts to sink sufficient current out of the sensor to discern whether the sensor is truly closed or merely shorted by foreign material. In general, a first leg 43a of the signal integrity check circuit 43 is set up as a constant current sink by virtue of a zener diode 144 that maintains a constant voltage across a resistor 148 connected to the emitter of a first transistor 145. In the disclosed embodiment, the first leg of the circuit sinks about 35 mA. A second leg of the circuit 43b produces the validation signal 47 when a second transistor 146 is turned on by current in excess of 35 mA passing through a second resistor 149 connected to its base. When the sensor is producing a closed output caused by the switch being closed, the sufficient current can be pulled through the sensor to turn on the second transistor 146 and produce the validation signal. When the sensor is shorted by foreign material, it is unlikely that sufficient current can be pulled through the shorted sensor and the validation signal will not be produced. FIG. 4b illustrates a second signal integrity check circuit 43 that tests inputs from a start switch, a PTO switch, a seat switch, and a parking brake switch. The circuit of FIG. 4b operates in the same manner just described for FIG. 4a.

Figure 5:
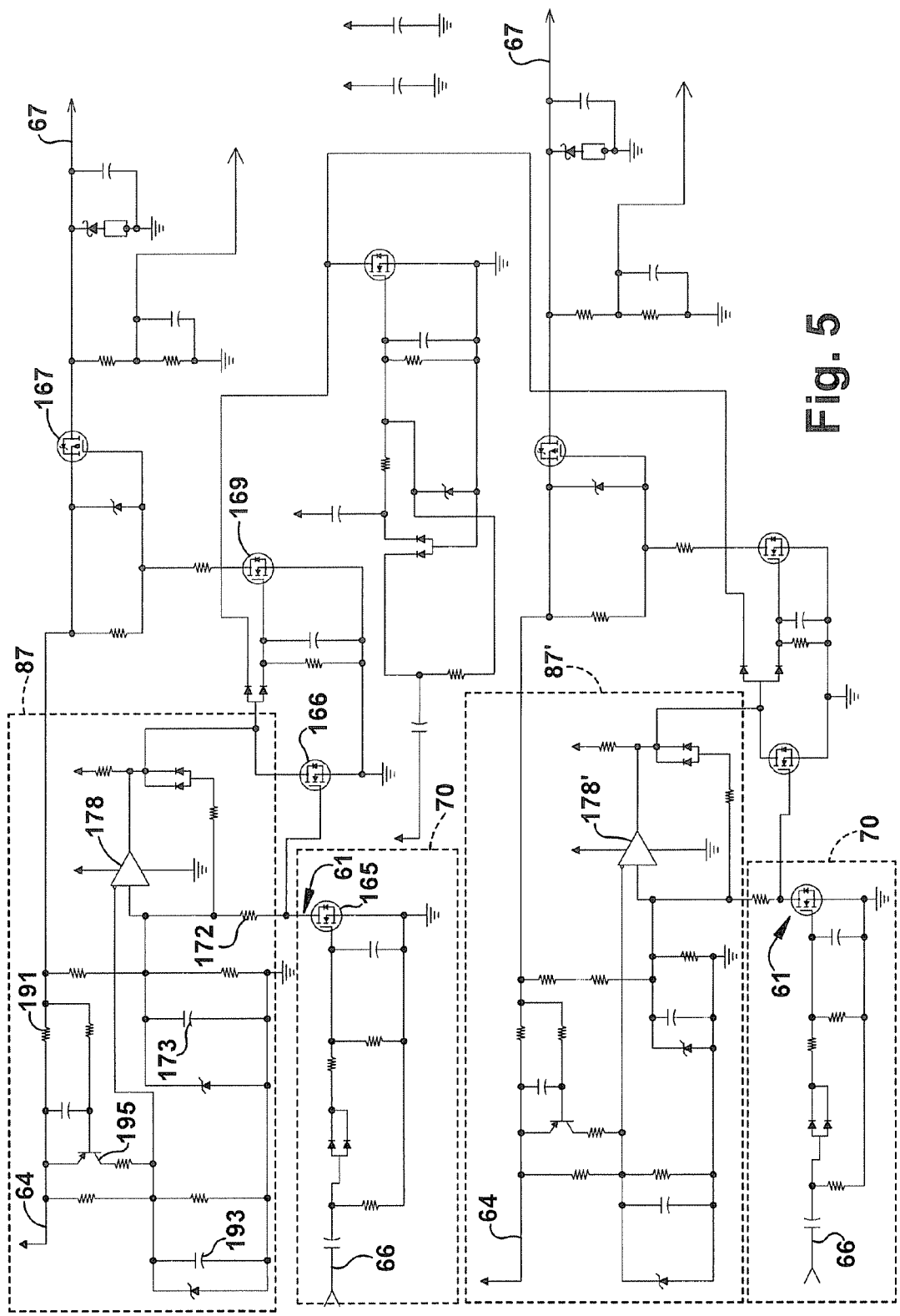

Referring now to FIG. 5, an exemplary circuit is shown that includes the enable signal check circuit 70 that processes the AC enable signals 66 and allows passage of power 67 to the starter solenoid and PTO electromagnetic clutch. The exemplary circuit also includes an embodiment of the surge protector 87. FIG. 5 includes two exemplary circuits, a top circuit that outputs power 67 to the starter solenoid and a bottom circuit that outputs power to the PTO electromagnetic clutch. As both circuits function in substantially the same manner, only the top circuit will be described in detail here. The AC enable signal 66 is input to the enable signal check 70. The various circuit components filter and rectify the AC signal to transform the AC signal into a DC pulse train. The DC pulse train is the gate input to a MOSFET 165 that closes when a pulse train is present to form an enable signal along line 61 for the remainder of the circuit. When a pulse train is not present, an AC enable signal has not been generated by the controller, and the MOSFET 165 opens to disable the circuit. In this manner, a false enable signal caused by a shorted component likely cannot enable the flow of power to the starter solenoid.

A start voltage 64 is connected to the surge protection 87 portion of the circuit when the key is turned to the start position. During normal operating conditions, the start voltage is essentially passed through to the starter solenoid at output 67. When the AC signal is present and MOSFET 165 is conducting current between its drain and base, a voltage is present across resistor 172. This voltage is input to a comparator 178 that in response to the presence of a voltage on this input produces an output that enables passage of power to the starter solenoid. When the MOSFET 165 is conducting, a MOSFET 166 is turned off so that the output of the comparator 178 is not grounded through the MOSFET 166. In this state, the output of the comparator 178 turns on a MOSFET 169 that in turn turns on a MOSFET 167 to allow the passage of current through the output 67 to the solenoid. When the AC enable signal 66 is not present, the MOSFET 165 turns off causing the MOSFET 166 to turn on and pull the output of the comparator to ground. With the output of the comparator grounded, the MOSFET 169 is off as is the MOSFET 167 and current cannot pass through the MOSFET 167 to power the starter solenoid.

The surge protector 87 is implemented in the circuit shown in FIG. 5 by virtue of a timed shut off feature that is dependent upon the amount of current that flows through a resistor 191. Two capacitors, 193, 173 are initially charged to a specific level. When a high current surge is present for more than a preset amount of time, the capacitor 173 discharges. When the voltage of the capacitor 173 reaches that of the other capacitor 193, the output of the comparator 178 will be switched to ground. As already discussed, when the output of the comparator is grounded, the MOSFET 167 will be turned off and power cannot pass to the output 67. In the described embodiment, the output of the comparator will switch to ground when a current of 30 A is present for longer than approximately 0.1 seconds.

A secondary surge protection mechanism is also present in the circuit. When the drain of the MOSFET is shorted to ground and the circuit is enabled, the voltage that develops across the resistor 191 will be imposed across the emitter to base junction of a transistor 195. This will cause the transistor to turn on and allow current to flow from emitter to collector. This current flow will cause the voltage across the capacitor 193 to increase at a rapid rate. When the voltage of the capacitor 193 reaches that of the other capacitor 173, the output of the comparator 178 will switch to ground. As already discussed, when the output of the comparator 178 is grounded, the MOSFET 167 will be turned off. This part of the circuit operates at a speed approximately 1000 times faster than the circuit operation described in the previous paragraph.

Figure 6:
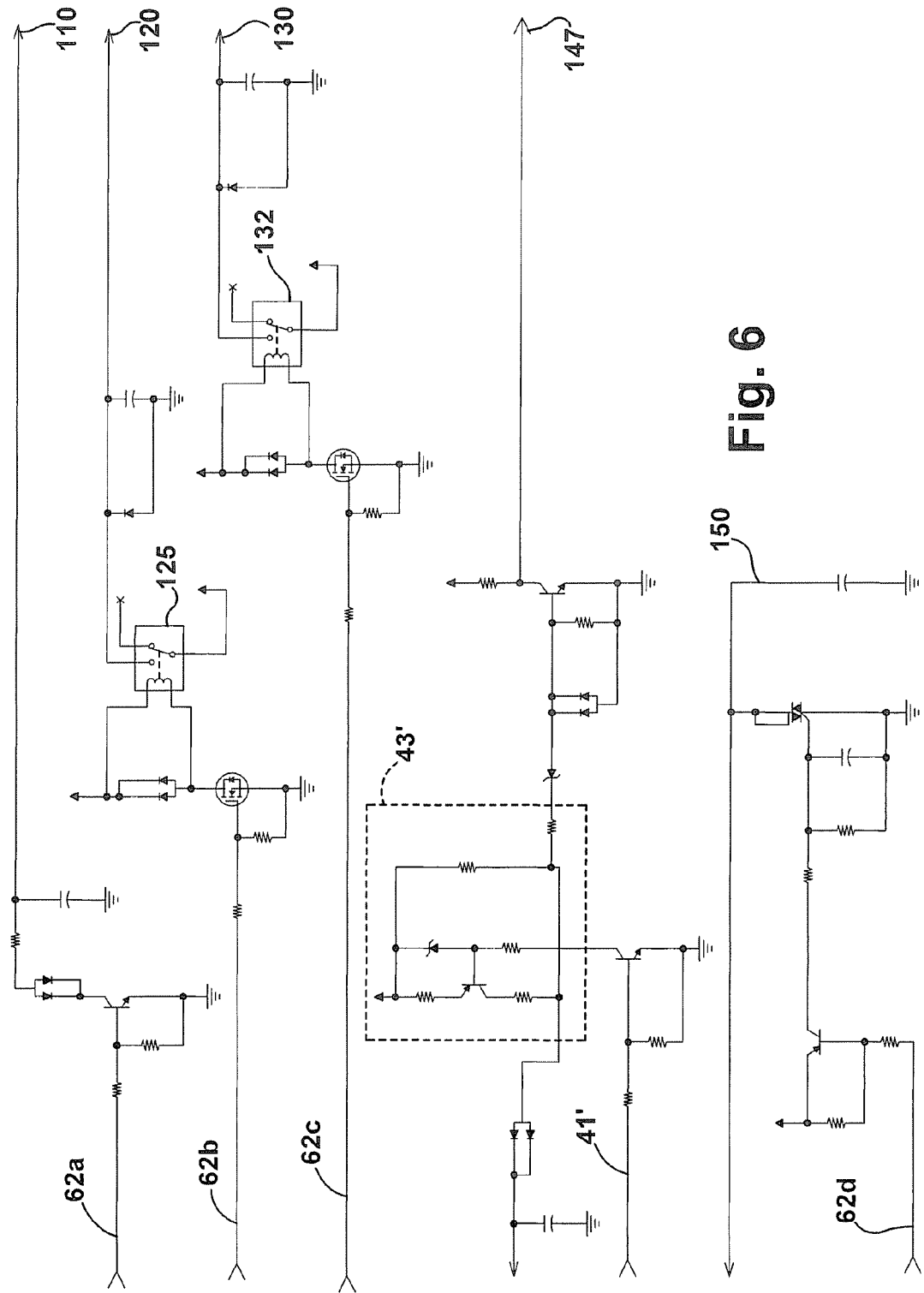

FIG. 6 illustrates various circuits that are enabled by the DC enable signals 62a-62e that are generated by the controller (also shown in FIG. 1). A diagnostic LED enable signal 62a is passed to a diagnostic LED illumination output 110 to cause the LED to flash in various patterns depending on operating conditions detected by the controller. A deck lift enable signal 62b controls a relay 125 that switches 12V to a deck lift actuator 120 in the presence of the enable signal 62b. Similarly, a fuel pump enable signal 62c controls a relay 132 that switches 12V to the fuel pump 130 in the presence of the enable signal 62c. When a magneto disable signal 62d is present, magneto power 150 is allowed to flow to the magneto during normal operating conditions. Also shown in FIG. 6 is a signal integrity check circuit 43' that acts on an engine over-temperature sensor. Since this is a normally open sensor, the signal integrity check circuit 43' acts as a current source that pumps current through the over temperature sensor to detect a false open condition. The validation output 147 is output when current cannot be passed through the sensor.

As can be seen from the foregoing description, a control system that includes a signal integrity check on input signals to the controller and/or an AC enable output helps protect against faulty control based on false signals caused by component malfunction. It should be understood that the embodiments discussed above are representative of aspects of the inventions and are provided as examples and not an exhaustive description of implementations of an aspect of one or more of the inventions.

While various aspects of the inventions are described and illustrated herein as embodied in combination in the exemplary embodiments, these various aspects may be realized in many alternative embodiments, either individually or in various combinations and subs combinations thereof. Unless expressly excluded herein all such combinations and sub-combinations are intended to be within the scope of the present inventions. Still further, while various alternative embodiments as to the various aspects and features of the inventions, such as alternative materials, structures, configurations, methods, devices, software, hardware, control logic and so on may be described herein, such descriptions are not intended to be a complete or exhaustive list of available alternative embodiments, whether presently known or later developed. Those skilled in the art may readily adopt one or more of the aspects, concepts or features of the inventions into additional embodiments within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present inventions however, such values and ranges are not to be construed in a limiting sense and are intended to be critical values or ranges only if so expressly stated.

I claim:

1. A method that selectively provides power to an electrical device comprising the steps of:
monitoring at least one status sensor;
comparing a present state of the status sensor to an enable state;
when the present state of the status sensor is the enable state, generating an AC device enable signal; and
transmitting the AC device enable signal to a device control circuit that passes power to the device in response to the AC device enable signal.

2. The method of claim 1 comprising the step of conditioning the AC device enable signal prior to transmitting the AC device enable signal to the sta4 device control circuit.

3. The method of claim 2 wherein the step of conditioning the AC device enable signal is performed by converting the AC device enable signal into a DC pulse train.

4. The method of claim 3 wherein the DC pulse train maintains a device bypass ground path for the operation signal in a non-conducting condition.

5. The method of claim 1 wherein the steps of monitoring the at least one status switch, comparing the present state of the status switch to the enable state, and generating the AC voltage are performed with a microprocessor.

6. The method of claim 1 comprising the steps of:
monitoring a current draw of the electrical device;
detecting a first operational mode and disabling the flow of current to the device if the current exceeds a predetermined surge current for longer than a predetermined surge time;
detecting a second operational mode and disabling the flow of current to the device if the current exceeds a predetermined run current for longer than a predetermined run time; and
disabling the flow of current if a number of times the first or second operational mode is detected exceeds a predetermined device lockout number.

7. An electrical device control system comprising:
a status sensor interface configured to receive at least one status sensor signal indicative of a present state of at least one status sensor;
a controller configured to received the at least one status sensor signal and transmit an AC device enable signal when the present state of the at least one status sensor is an enable state;
a device enable rectifier that transforms the AC device enable signal into a DC pulse train.

8. The electrical device control system Of claim 7 comprising a device start enabler configured to allow passage of electrical power to the electrical device in response to the AC device enable signal and wherein the device start enabler comprises a circuit that controls a ground path for electrical power to the electrical device, the ground path configured to bypass the electrical device by connecting the electrical power to ground in the absence of a pulse train from the rectifier.

9. The electrical device control system of claim 7 wherein the controller comprises:
a current monitor that monitors a current draw of the electrical device; and an operational state detector configured to:
detect a first operational mode and disable the flow of current to the device if the current exceeds a predetermined surge current for longer than a predetermined surge time;
detect a second operational mode and disable the flow of current to the device if the current exceeds a predetermined run current for longer than a predetermined run time; and
disable the flow of current if a number of times the first or second operational mode is detected exceeds a predetermined device lockout number.

10. A method that controls operation of an electrical device based on a present state of at least two sensors, wherein each sensor is configured to exhibit one of a discrete set of acceptable sensor states indicative of an operation condition, the method comprising the steps of:
polling the sensors by:
connecting a first of the sensors to an integrity checking circuit, wherein the integrity checking circuit is configured to output a validation signal when the state of the first sensor is one of the discrete set of acceptable sensor states;
sensing the presence of the validation signal;
connecting a second of the sensors to the integrity checking circuit;
sensing the presence of the validation signal; and
enabling operation of the electrical device when the validation signal is present.

11. The method of claim 10 comprising the step of disabling the operation of the electrical device when the validation signal is not present.

12. The method of claim 10 wherein the integrity checking circuit detects a short circuit condition of the sensor having its output connected to the integrity checking circuit.

13. The method of claim 12 wherein the integrity checking circuit detects the presence of a short circuit condition caused by moisture by sinking a predetermined amount of current through the sensor that is connected to the integrity checking circuit and outputting the validation signal when the sensor passes the predetermined amount of current.

14. The method of claim 10 wherein the step of polling the sensors is performed by decoding a multiplexed input to output a sample enable signal that connects the one of the two sensors to the integrity checking circuit.

15. The method of claim 10 comprising the steps of:
monitoring a current draw of the electrical device;
detecting a first operational mode and disabling the flow of current to the device if the current exceeds a predetermined surge current for longer than a predetermined surge time;
detecting a second operational mode and disabling the flow of current to the device if the current exceeds a predetermined run current for longer than a predetermined run time; and
disabling the flow of current if a number of times the first or second operational mode is detected exceeds a predetermined device lockout number.

16. An electrical device control system comprising:
a sensor integrity circuit configured to output a validation signal;
two or more sensors, each selectively coupled to the sensor integrity circuit and configured to exhibit one of a discrete set of acceptable sensor states;
one or more sensor selector circuits, each selector circuit corresponding to one of the two or more sensors and operative to selectively connect the corresponding sensor to the sensor integrity circuit;
a polling circuit configured to activate one of the sensor selector circuits to connect the corresponding one of the sensors to the sensor integrity circuit;

wherein the sensor integrity circuit is configured to output the validation signal when the state of the sensor coupled to the sensor integrity circuit is one of the discrete set of acceptable sensor states; and
a controller configured to monitor the validation signal.

17. The electrical device control system of claim 16 wherein the polling circuit comprises a decoder that decodes a multiplexed input and outputs a sample enable signal that activates one of the sensor selector circuits.

18. The electrical device control system of claim 16 wherein the controller is configured to enable operation of the electrical device when the validation signal is present.

19. The electrical device control system of claim 16 wherein the sensor integrity circuit comprises a current sink that draws a predetermined amount of current through the selected sensor and outputs the validation signal when the selected sensor passes the predetermined amount of current.

20. The electrical device control system of claim 16 wherein the controller comprises:
a current monitor that monitors a current draw of the electrical device; and
an operational state detector configured to:
detect a first operational mode and disable the flow of current to the device if the current exceeds a predetermined surge current for longer than a predetermined surge time;
detect a second operational mode and disable the flow of current to the device if the current exceeds a predetermined run current for longer than a predetermined run time; and
disable the flow of current if a number of times the first or second operational mode is detected exceeds a predetermined device lockout number.

21. An electrical device control system comprising:
a controller configured to generate at least one enable signal in response to receiving a respective at least one validation signal to allow power to be provided to a respective at least one electrical device; and
an integrity circuit configured to validate a state of at least one sensor based on a respective at least one sensor signal, the integrity circuit generating the at least one validation signal in response to the state of the sensor being determined as acceptable.

22. The system of claim 21, wherein the integrity circuit is configured to validate the state of the sensor based on a current magnitude of the at least one sensor signal.

23. The system of claim 22, wherein the integrity circuit is configured to generate the at least one validation signal in response to the current magnitude of the respective at least one sensor signal being greater than a predetermined threshold.

24. The system of claim 21, wherein the integrity circuit comprises:
a first current leg configured to conduct a first portion of current of a given one of the at least one sensor signal, the first portion of current having a substantially constant current magnitude; and
a second current leg configured to conduct a second portion of current of the given one of the at least one sensor signal, the integrity circuit being configured to generate a respective one of the at least one validation signal in response to a current magnitude of the second portion of current being greater than a predetermined threshold.

25. The system of claim 24, wherein the integrity circuit further comprises a transistor having a control input coupled to the second current leg, the transistor being activated to generate the respective one of the at least one validation signal in response to the current magnitude of the second portion of current being greater than the predetermined threshold.

26. The system of claim 21, wherein the at least one sensor comprises a plurality of sensors configured to generate a respective plurality of sensor signals, the system further comprising a decoder configured to couple a given one of the plurality of sensor signals to the integrity circuit in response to a selection signal provided by the controller, the integrity circuit being configured to validate the state of a respective one of the plurality of sensors based on the given one of the plurality of sensor signals.

27. A method for selectively providing power to an electrical device, the method comprising:
selecting a given one of a plurality of sensors for validation via a selection signal;
coupling a sensor signal associated with the given one of the plurality of sensors to an integrity circuit;
determining a state of the given one of the plurality of sensors based on the sensor signal;
generating a validation signal in response to the state of the given one of the plurality of sensors being determined as acceptable; and
providing an enable signal to the electrical device to allow the electrical device to receive power.

28. The method of claim 27, wherein determining the state of the given one of the plurality of sensors comprises:
conducting a portion of a current associated with the sensor signal through a current path; and
activating a transistor through which the in response to the portion of the current having a magnitude that is greater than a predetermined threshold, wherein generating the validation signal comprises generating the validation signal in response to activating the transistor.

29. The method of claim 28, wherein conducting the portion of the current comprises:
conducting a first portion of the current associated with the sensor signal through a first current path, the first portion of current having a substantially constant current magnitude; and
conducting a second portion of the current associated with the sensor signal through a second current path, the transistor having a control input that is coupled to the second current path.

* * * * *